US008549264B2

(12) United States Patent
Gopal et al.

(10) Patent No.: US 8,549,264 B2
(45) Date of Patent: Oct. 1, 2013

(54) ADD INSTRUCTIONS TO ADD THREE SOURCE OPERANDS

(75) Inventors: Vinodh Gopal, Westborough, MA (US); James D. Guilford, Northborough, MA (US); Gilbert M. Wolrich, Framingham, MA (US); Wajdi K. Feghali, Boston, MA (US); Erdinc Ozturk, Marlborough, MA (US); Martin G. Dixon, Portland, OR (US); Sean P. Mirkes, Beaverton, OR (US); Bret L. Toll, Hillsboro, OR (US); Maxim Loktyukhin, Folsom, CA (US); Mark C. Davis, Portland, OR (US); Alexandre J. Farcy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 12/645,334

(22) Filed: Dec. 22, 2009

(65) Prior Publication Data

US 2011/0153993 A1  Jun. 23, 2011

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC ........................................................ 712/221

(58) Field of Classification Search
None
See application file for complete search history.

(56) References Cited

U.S. PATENT DOCUMENTS

| | | | |
|---|---|---|---|
| 4,901,270 A | 2/1990 | Galbi et al. | |
| 5,508,951 A * | 4/1996 | Ishikawa | 708/552 |
| 5,696,711 A | 12/1997 | Makineni | |
| 6,205,534 B1 * | 3/2001 | Kamiyama et al. | 712/32 |
| 6,253,310 B1 | 6/2001 | Ramirez et al. | |
| 6,338,136 B1 * | 1/2002 | Col et al. | 712/221 |
| 6,470,374 B1 | 10/2002 | Jin et al. | |
| 7,085,795 B2 | 8/2006 | Debes et al. | |
| 7,290,024 B2 | 10/2007 | Tang et al. | |
| 7,523,152 B2 | 4/2009 | Roussel et al. | |
| 7,624,138 B2 | 11/2009 | Debes et al. | |
| 2007/0299899 A1 | 12/2007 | Hasenplaugh et al. | |
| 2008/0069337 A1 | 3/2008 | Gopal et al. | |
| 2008/0144810 A1 | 6/2008 | Gopal et al. | |
| 2008/0144811 A1 | 6/2008 | Gopal et al. | |
| 2008/0148011 A1 | 6/2008 | Gopal et al. | |
| 2008/0159526 A1 | 7/2008 | Gueron et al. | |
| 2008/0229116 A1 | 9/2008 | Dixon et al. | |
| 2008/0240421 A1 | 10/2008 | Gopal | |

(Continued)

OTHER PUBLICATIONS

"NITROX II", *Cavium Networks*, http://www.caviumnetworks.com/processor_security_nitroxll.htm (Nov. 11, 2009), (2000-2009), 1 pg.

(Continued)

*Primary Examiner* — Corey S Faherty
(74) *Attorney, Agent, or Firm* — Blakely, Sokoloff, Taylor & Zafman LLP

(57) ABSTRACT

A method in one aspect may include receiving an add instruction. The add instruction may indicate a first source operand, a second source operand, and a third source operand. A sum of the first, second, and third source operands may be stored as a result of the add instruction. The sum may be stored partly in a destination operand indicated by the add instruction and partly a plurality of flags. Other methods are also disclosed, as are apparatus, systems, and instructions on machine-readable medium.

30 Claims, 12 Drawing Sheets

(56) References Cited

U.S. PATENT DOCUMENTS

| | | |
|---|---|---|
| 2008/0240422 A1 | 10/2008 | Ozturk et al. |
| 2008/0240426 A1 | 10/2008 | Gueron et al. |
| 2008/0304659 A1 | 12/2008 | Ozturk et al. |
| 2009/0003594 A1 | 1/2009 | Ozturk et al. |
| 2009/0003596 A1 | 1/2009 | Ozturk et al. |
| 2009/0006517 A1 | 1/2009 | Gopal et al. |

OTHER PUBLICATIONS

"Software Optimization Guide for AMD Family 10h Processors", *Advanced Micro Devices, Publication 40546 Revision 3.09*, (Nov. 2008), pps. i-xviii & 1-316.

"Software Optimization Resources", http://www.agner.org/optimize (Jan. 5, 2010), (2009), 1-5.

"The SPARC Architecture Manual, Version 8", *SPARC International, Inc.*, (1991, 1992), pp. 1-303.

"UltraSPARC Cryptographic Performance", *UltraSPARC cryptographic accelerators-Wikipedia*, http://wikis.sun.com/display/CryptoPerf/UltraSPARC+cryptographic+performance (Nov. 11, 2009), (Jul. 8, 2008), pp. 1-5.

"VIA Nano Processor", *VIA Technologies, Inc.*, (2008), pp. 1-15.

Fog, Agner "Optimization Manual 4 Instruction Tables", *Copenhagen University College of Engineering*, Software Optimization Resources, http://www.agner.org/optimize (Jan. 5, 2010), (1996-2009), pp. 1-154.

Henry, G. G., "The VIA Isaiah Architecture", *Centaur Technology, Inc.*, (Jan. 2008), pp. 1-12.

"Intel Architecture Software Developer's Manual vol. 2: Instruction Set Reference," Intel, 1999, pp. 1-2 and 3-448-3-449.

Intel "Intel Itanium Architecture Software Developer's Manual vol. 3: Instruction Set Reference" Revision 2.2, (Jan. 2006) Doc. No. 245319-005, pp. i-x and 3:14.

Intel "Intel 64 and IA-32 Architectures Software Developer's Manual vol. 2A: Instruction Set Reference, A-M" (Sep. 2009) Order No. 253666-032US, pp. 1-2 and 3-34-3-36.

U.S. Appl. No. 12/368,196, filed Feb. 9, 2009, Gopal et al.

"Intel 64 and IA-32 Architectures Software Developer's Manual", vol. 2A: Instruction Set Reference, A-M. Order No. 253666-0032US. Sep. 2009. pp. 1-6.

\* cited by examiner

740

| | 31 | | 0 | |
|---|---|---|---|---|
| | | AX | | EAX |
| | | BX | | EBX |
| | | CX | | ECX |
| | | DX | | EDX |
| | | ESI | | |
| | | EDI | | |
| | | EBP | | |
| | | ESP | | |

| 63 | 31 | 0 | |
|---|---|---|---|
| | | EAX | RAX |
| | | EBX | RBX |
| | | ECX | RCX |
| | | EDX | RDX |
| | | ESI | RSI |
| | | EDI | RDI |
| | | EBP | RBP |
| | | ESP | RSP |
| | | | R8 |
| | | | R9 |
| | | | R10 |
| | | | R11 |
| | | | R12 |
| | | | R13 |
| | | | R14 |
| | | | R15 |

*FIG. 8*

| INSTRUCTION | DESCRIPTION |
|---|---|
| ADD3 — UNSIGNED INTEGER ADDITION OF THREE OPERANDS | PERFORMS UNSIGNED ADDITION OF THREE UNSIGNED INTEGER OPERANDS. RAX/EAX REGISTER IS USED AS IMPLICIT SOURCE OPERAND. DEFAULT OPERAND SIZE IS 32 BITS. 64-BIT OPERAND SIZE USES REX.W=1. IN 64-BIT MODE, ADD3 USES CARRY AND OVERFLOW FLAGS IN CONJUNCTION TO REPRESENT BIT[64] AND BIT[65] RESPECTIVELY OF RESULTING SUM. IN 32-BIT MODE, ADD3 USES CARRY AND OVERFLOW FLAG IN CONJUNCTION TO REPRESENT BIT[32] AND BIT[33] RESPECTIVELY OF RESULTING SUM. PREFIX BYTE OF 66H BEFORE THIS INSTRUCTION WILL CAUSE #UD. |

*FIG. 9*

```
IF (OperandSize = 32)
    TEMP[33:0] ← DEST + EAX + SRC
    DEST ← TEMP[31:0]
    CF ← TEMP [32]
    OF ← TEMP [33]
ELSE
    IF (OperandSize = 64)
        TEMP [65:0] ← DEST + RAX + SRC
        DEST ← TEMP [63:0]
        CF ← TEMP [64]
        OF ← TEMP [65]
    FI
```

*FIG. 10*

| INSTRUCTION | DESCRIPTION |
|---|---|
| ADOC3 — UNSIGNED INTEGER ADDITION OF THREE OPERANDS WITH OF/CF FLAGS | PERFORMS UNSIGNED ADDITION OF THREE UNSIGNED INTEGER OPERANDS WITH OVERFLOW FLAG AND CARRY FLAG. RAX/EAX REGISTER IS USED AS IMPLICIT SOURCE OPERAND. DEFAULT OPERAND SIZE IS 32 BITS. 64-BIT OPERAND SIZE USES REX.W=1. IN 64-BIT MODE, ADOC3 USES CARRY AND OVERFLOW FLAGS IN CONJUNCTION TO REPRESENT BIT[64] AND BIT[65] RESPECTIVELY OF RESULTING SUM. IN 32-BIT MODE, ADOC3 USES CARRY AND OVERFLOW FLAGS TO REPRESENT BIT[32] AND BIT[33] RESPECTIVELY OF SUM. ADOC3 USES CF AND OF AS SOURCE OPERANDS AND COMBINES THEM INTO SUM. INPUT OF AND CF VALUES HAVE NO RESTRICTIONS; IF FLAGS ARE BOTH 1, RESULTS OF INSTRUCTION ARE PERFECTLY WELL DEFINED SINCE LARGEST VALUES GENERATED WILL NOT CAUSE OVERFLOWS. PREFIX BYTE OF 66H BEFORE THIS INSTRUCTION WILL CAUSE #UD. |

*FIG. 11*

```
IF (OPERANDSIZE = 32)
    TEMP[33:0] ← DEST + EAX + SRC + (2*OF) + CF
    DEST ← TEMP [31:0]
    CF ← TEMP [32]
    OF ← TEMP [33]
ELSE
    IF (OPERANDSIZE = 64)
        TEMP [65:0] ← DEST+RAX+SRC+(2*OF)+CF
        DEST ← TEMP[63:0]
        CF ← TEMP[64]
        OF ← TEMP[65]
    FI
FI
```

*FIG. 12*

ADD INSTRUCTIONS TO ADD THREE SOURCE OPERANDS

BACKGROUND

1. Field

Various different embodiments relate to add instructions, methods of executing the instructions, execution units to execute the instructions, or devices incorporating such execution units. In particular, various different embodiments relate to add instructions to perform three-way addition with carries, methods of executing the instructions, execution units to execute the instructions, or devices incorporating such execution units.

2. Background Information

Add instructions are commonly included in instruction set architectures (ISAs). The add instructions allow devices to add or sum data.

Known add instructions include the ADD—Add instruction, and the ADC—Add with Carry instruction, which are both described in the Intel® 64 and IA-32 Architectures Software Developer's Manual Volume 2A: Instruction Set Reference, A-M, Order Number: 253666-032US, September 2009, as well as in various older manuals.

The ADD and ADC instructions are each only capable of adding two operands. In certain instances, this may have drawbacks.

Due to the importance of quickly and efficiently processing data, new and different add instructions would be useful.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 7 illustrates an example embodiment of a suitable 32-bit general-purpose register set.

FIG. 8 illustrates an example embodiment of a suitable 64-bit general-purpose register set.

FIG. 9 shows a description of an ADD3 instruction representing a particular example embodiment of an add instruction.

FIG. 10 shows operation in pseudocode of an ADD3 instruction representing a particular example embodiment of an add instruction.

FIG. 11 shows a description of an ADOC3 instruction representing a particular example embodiment of an add with flags instruction.

FIG. 12 shows operation in pseudocode of an ADOC3 instruction representing a particular example embodiment of an add with flags instruction.

DETAILED DESCRIPTION

In the following description, numerous specific details, such as instruction implementation specifics, data types, register types, register arrangements, processor types, system configurations, and the like, are set forth. However, it is understood that embodiments of the invention may be practiced without these specific details. In other instances, well-known circuits, structures and techniques have not been shown in detail in order not to obscure the understanding of this description.

Embodiments pertain to new and useful add instructions capable of adding together three operands. Other embodiments pertain execution units to execute the add instructions. Still other embodiments pertain to general-purpose processors, special-purpose processors, controllers, or other logic devices or instruction processing apparatus having such execution units or capable of executing such instructions. Further embodiments pertain to add instructions stored on a disc, memory, or other tangible machine-readable medium.

Figure 1:
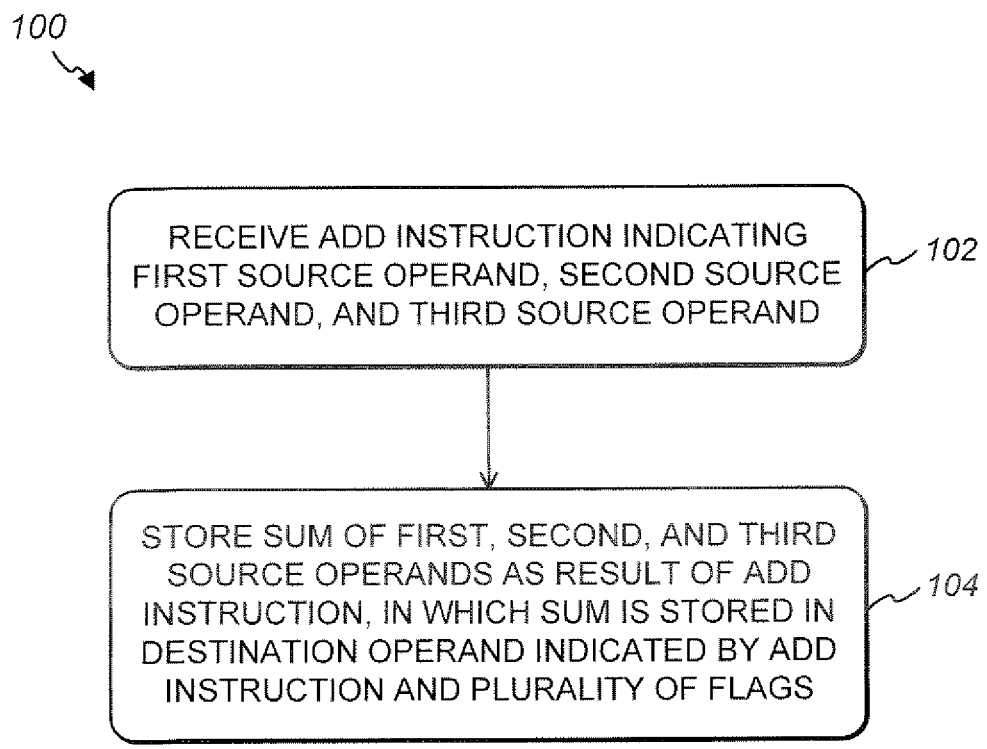
FIG. 1 is a block flow diagram of an embodiment of a method of processing an embodiment of an add instruction.

FIG. 1 is a block flow diagram of an embodiment of a method 100 of processing an embodiment of an add instruction. In various embodiments, the method may be performed by a general-purpose processor, a special-purpose processor (e.g., a graphics processor or a digital signal processor), a hardware accelerator (e.g., a cryptographic accelerator), or another type of logic device or instruction processing apparatus.

An add instruction may be received at the processor or other instruction processing apparatus, at block 102. The add instruction may indicate a first source operand, a second source operand, and a third source operand.

Then, a sum of the first, second, and third source operands may be stored as a result of the add instruction, at block 104. In one or more embodiments, the sum may be stored partly in a destination operand indicated by the add instruction and partly in a plurality of flags. In one or more embodiments, the sum that is stored may include a sum of the first, second, and third source operands added to an arithmetic combination of the flags.

Figure 2:
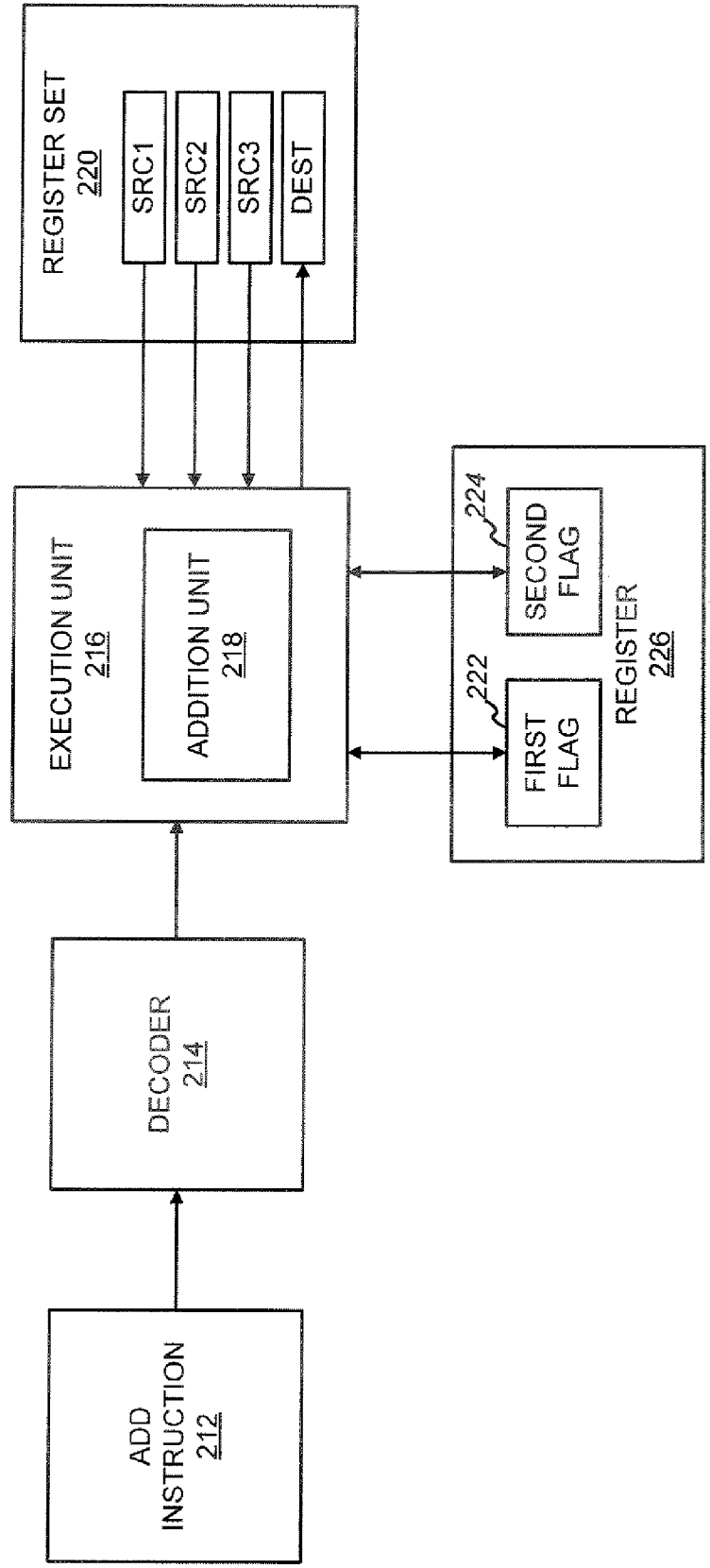
FIG. 2 is a block diagram of an example embodiment of an instruction processing apparatus.

FIG. 2 is a block diagram of an example embodiment of an instruction processing apparatus 210. In one or more embodiments, the instruction processing apparatus may be a general-purpose processor. The processor may be any of various complex instruction set computing (CISC) processors, various reduced instruction set computing (RISC) processors, various very long instruction word (VLIW) processors, various hybrids thereof, or other types of processors entirely. In one or more embodiments, the processor may be a general-purpose processor of the type manufactured by Intel Corporation, of Santa Clara, Calif., although this is not required. Specific examples of general-purpose processors available from Intel Corporation include, but are not limited to, Intel® Core™ i7 processor Extreme Edition, Intel® Core™ i7 processor, Intel® Core™ i5 processor, Intel® Core™2 Extreme processor, Intel® Core™2 Quad processor, Intel® Core™2 Duo processor, Intel® Pentium® processor, and Intel® Celeron® processor.

Alternatively, the instruction processing apparatus may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors entirely.

In still other embodiments, the instruction processing apparatus may be a controller (e.g., a microcontroller), or other type of logic circuit capable of processing instructions.

Referring again to FIG. 2, during use the instruction processing apparatus may receive an embodiment of an add instruction 212. By way of example, the add instruction may be received from a memory or from software. In one or more embodiments, the add instruction may indicate a first source operand, a second source operand, and a third source operand. The add instruction may indicate that the three source operands are to be summed and the sum stored in a destination operand indicated by the add instruction. The add instruction may implicitly indicate and/or explicitly specify the source and destination operands. For example, the add instruction may have one or more dedicated fields or sets of bits to explicitly specify a register, memory, or other storage location corresponding to one or more operands.

The add instruction may represent a machine instruction or control signal that is recognized by the instruction processing apparatus. The instruction processing apparatus may have specific or particular circuitry or other logic (e.g., software combined with hardware and/or firmware) that is operable to perform an addition operation on three source operands in response to and/or as specified by the add instruction, and store a sum in the destination in response to, or as a result of, the add instruction.

The illustrated embodiment of the instruction processing apparatus includes an instruction decoder 214. The decoder may receive and decode the add instruction 212. The decoder may generate and output one or more micro-operations, micro-code entry points, microinstructions, other instructions, or other control signals, which reflect, or are derived from, the original add instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder is not a required component of the apparatus. In one or more other embodiments, the apparatus may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the add instruction, emulate, translate, morph, interpret, or otherwise convert the add instruction, and output one or more instructions or control signals corresponding to the original add instruction. The instruction conversion logic may be implemented in software, hardware, firmware, or a combination thereof. In some cases, some or all of the instruction conversion logic may be located off-die from the rest of the instruction processing apparatus, such as a separate die or in a system memory. In some cases, the instruction processing apparatus may have both the decoder and the instruction conversion logic.

Referring again to FIG. 2, the instruction processing apparatus includes an execution unit 216. By way of example, the execution unit may include an arithmetic unit, an arithmetic logic unit, or the like. The execution unit includes an addition unit 218 that is capable of performing addition, such as, for example, signed and unsigned integer addition.

In the illustrated embodiment, the execution unit is coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact with each other (e.g., through an intervening component). As one example, the decoder and the execution unit may be coupled with one another through an intervening optional buffer and/or through one or more other component(s) known in the arts to possibly be coupled between a decoder and an execution unit. As a result of the decoder decoding the add instruction, the execution unit may receive one or more micro-operations, micro-code entry points, microinstructions, other instructions, or other control signals, which reflect, or are derived from, the add instruction. Alternatively, the execution unit may receive and execute instructions or control signals from the aforementioned instruction conversion logic.

As a result of the add instruction, the decoder, or another portion of the apparatus, may access the three source operands indicated by the add instruction. The source operands may be stored in registers, memory, or other storage locations. In the illustrated embodiment, a first source operand (SRC1), a second source operand (SRC2), and a third source operand (SRC3) are all stored in registers of a register set 220, although this is not required.

The register set 220 may be part of a register file, along with potentially other registers (e.g., control registers, status registers, flag registers, etc). Each register may be a storage location or device that may be used to store data. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. The register set may often be physically located on die with the execution unit. The registers may be visible from the outside of the processor or from a programmer's perspective. For example, instructions may specify operands stored in the registers.

The execution unit may include circuitry or other execution logic (e.g., various combinations of software and/or hardware and/or firmware) operable to execute the add instruction (e.g., one or more instructions or other control signals derived from the add instruction). In one or more embodiments, the execution unit may be operable as a result of the add instruction 212 indicating a first source operand (SRC1), a second source operand (SRC2), and a third source operand (SRC3), to store a sum of the first, second, and third source operands as a result of the add instruction partly in a destination operand (DEST) indicated by the add instruction. As shown, the destination operand (DEST) may be a register. Alternatively, the destination operand may be a location in memory or another storage location. In the illustration, the destination operand corresponds to a separate register from registers used for the source operands. Alternatively a register used for a source operand may also be used for the destination operand, for example, the destination operand may overwrite the source operand.

In one or more embodiments, in addition to being stored partly in the destination operand (DEST), the sum may also be stored partly in a plurality of flags, such as a first flag 222 and a second flag 224. As shown, the flags may be stored in a register 226, such as, for example, a status register, a flags register, or a condition code register, although this is not required.

Processors and various other types of logic devices often have flags. For example, the flags may each include one or more bits, and each bit may have a binary value of one or zero. These different values of the flags may have assigned or understood meanings to the processor or other logic device. The flags are used for various different purposes. In some cases the flags are used to record a status, state, condition, or outcome of operations.

In one or more embodiments, the first flag 222 may be a carry flag and the carry flag 222 may be used to store part of the sum. Carry flags are a well-known type of architectural flag or status flag that are commonly found in processors and other logic devices. The carry flag may be used to indicate whether or not there is overflow in an arithmetic operation. For example, the carry flag may be a single bit that may have a first value (e.g., a binary value of 1) if there is overflow during a prior operation, such as a carry or borrow out of the most-significant bit of the result in an arithmetic operation, or the carry flag may otherwise have a second value (e.g., a binary value of 0) if there is no such overflow. The carry flag may be used to indicate that an arithmetic operation has generated a result that is greater in magnitude than the number of bits in a given register or storage location can represent. The carry flag may be utilized in arithmetic operations, such as addition and subtraction.

To further illustrate how a carry flag may be used in addition, consider an example in which the numbers 255 and 255 are added together using 8-bit unsigned integers. The value of 255 plus 255 is 510. The number 510 is represented in binary as "1 1111 1110." However, note that "1 1111 1110" has 9-bits instead of just 8-bits. In other words, representing the number 510 in binary requires 9-bits, instead of just 8-bits. The eight least significant bits "1111 1110" is the binary representation for the number 254. Since the sum of 255 plus 255 generates a "carry" out of the most significant eighth bit into the ninth bit, the carry flag may be set to a value of 1. Setting the carry flag to a value of 1 may indicate to the machine that the result is incorrect in an 8-bit unsigned interpretation and/or may indicate that the correct result is the 9-bit concatenation of the 1-bit carry flag with the 8-bit result. The carry flag may be used (e.g., as a carry-in) for a subsequent arithmetic operation, such as addition or and subtraction.

In one or more embodiments, the first flag 222 may be the carry flag, and the second flag 224 may be an architectural flag, which may be used roughly analogously to the way the carry flag 222 is used. The architectural flag 224 may be used to indicate whether or not there is overflow in arithmetic operations. For example, the architectural flag 224 may be a single bit that may have a first value (e.g., a binary value of 1) if there is overflow out of the carry flag 222 during a prior operation, or the architectural flag 224 may otherwise have a second value (e.g., a binary value of 0) if there is no such overflow out of the carry flag 222. The architectural flag 224 may be used to indicate that an arithmetic operation has generated a result that is greater in magnitude than the number of bits in a given register or storage location plus the first flag (e.g., the carry flag) can represent. The first flag (e.g., the carry flag) 222 and the second or additional architectural flag 224 may each provide at least one additional bit that may be used to store the sum of the add instruction.

In one or more embodiments, the second or additional architectural flag 224 may be an overflow flag. Overflow flags are another well-known type of architectural or status flag that are commonly found in processors and other logic devices. However, overflow flags are not conventionally used in the way the second or additional architectural flag 224 is described above as being used. The in the case of the ADD and ADC instructions the overflow flag is currently defined to detect overflow for signed integers. However, the overflow flag is not conventionally used in combination with another flag to store part of a sum. Also, the overflow flag is not conventionally used in combination with another flag to provide multiple carries. Also, the overflow flag is not conventionally used as an extension of a width of unsigned operands.

Accordingly, use of the overflow flag as described above is a re-purposing of the carry flag. Alternatively, in one or more other embodiments, another existing architectural flag may be re-purposed. In an existing architecture, such re-purposing of an existing architectural flag may tend to represent a lesser change to the overall architecture and documentation than introducing an entirely new or dedicated flag. Alternatively, in one or more embodiments, one or more new or dedicated flags may be introduced for the first and/or second flags to be used for the purposes described herein.

To avoid obscuring the description, a relatively simple instruction processing apparatus has been shown and described. It is to be appreciated that other embodiments may have a plurality of execution units. For example, the apparatus may include multiple different types of execution units, such as, for example, arithmetic units, arithmetic logic units (ALUs), integer units, etc. At least one of these units may be responsive to an embodiment of add instruction as disclosed herein. Still other embodiments may have multiple cores, logical processors, or execution engines. An execution unit operable to execute an add instruction as disclosed herein may be included within at least one, at least two, most, or all of the cores, logical processors, or execution engines.

The instruction processing apparatus may also optionally include one or more other well-known components. For example, other embodiments may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope of the invention is not limited to any known such combination or configuration. Embodiments may be implemented either with or without such additional components.

Figure 3:
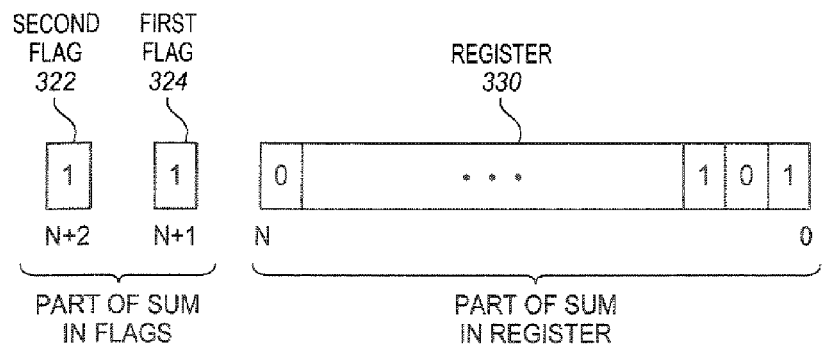
FIG. 3 is a block diagram illustrating an embodiment of a combination of a register and a plurality of flags that may be used to store a sum of an embodiment of an add instruction.

FIG. 3 is a block diagram illustrating an embodiment of a combination of a register 330 and a plurality of flags 322, 324 that may be used to store a sum of an embodiment of an add instruction. A register has bits [N:0]. The register may be used to store part of the sum. A few representative bits of the sum are shown stored in the register.

A first flag 322 has one additional bit [N+1] Likewise, a second flag 324 has one additional bit [N+2]. The two bits of the flags provide two additional bits to store another part of the sum. The two bits of the flags [N+2:N+1] may be interpreted or understood by the machine as a concatenation of the bits of the register [N:0] providing a complete sum. The bit [N+2] is to store a most significant bit (MSB) of the sum. The bit [N+1] is to store a next to most significant bit (MSB) of the sum.

As one concrete example, the register may have bits [31:0] to store part of the sum, the first flag 322 may have an additional bit [32] and the second flag 324 may also have an additional bit [33] which may collectively be used to store part of the sum. As another concrete example, the register may have bits [63:0] to store part of the sum, and the first and second flags may have two additional bits [65:64] to store part of the sum.

Advantageously, these additional bits provided by the first and second flags may allow a larger sum to be stored. When adding three numbers an extra bit of carry may be needed in some cases. When adding three source operands, depending upon the values of the operands, these additional bits may be used and/or needed to store the resulting sum. Consider an example for operands in 64-bit registers. Since the largest unsigned value of the 3 registers can be $(2^{64}-1)$, the resulting intermediate sum can be at most $3*2^{64}$ if OF:CF=1:1. This value is less than $(2^{66}-1)$. Accordingly, two additional bits provided by flags, in addition to the 64-bits provided by the register, are sufficient to represent the most significant bits of a sum of any three values stored in three corresponding 64-bit registers. The largest value generated by the add instruction summing the three source operands will not cause overflow. Similarly, the two additional bits provided by flags in addition to a 32-bit register are sufficient to represent the most significant bits of a sum of any three values stored in three corresponding 32-bit registers.

In one or more embodiments, the add instruction may add integers. In one or more embodiments, the integers may be unsigned integers. Alternatively, in one or more embodiments, the integers may be signed integers. To illustrate certain concepts, the present disclosure will tend to emphasize multiplication of unsigned integers, although the scope of the invention is not so limited.

Figure 4:
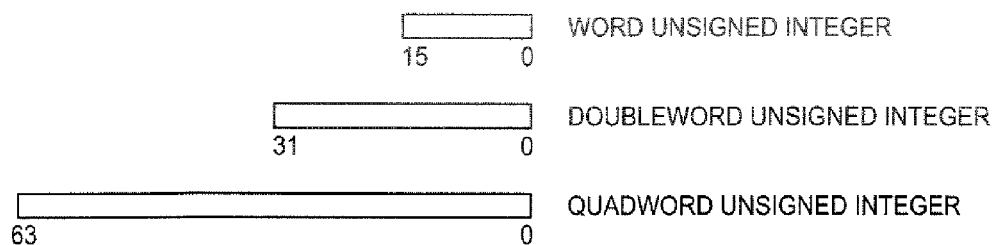
FIG. 4 illustrates various unsigned integer numeric data types that are suitable for various embodiments.

FIG. 4 illustrates various unsigned integer numeric data types that are suitable for various embodiments. A first type is a "word unsigned integer". The word unsigned integer has 16-bits. A second type is a doubleword unsigned integer. The doubleword unsigned integer has 32-bits. A third type is a quadword unsigned integer. The quadword unsigned integer has 64-bits. These are just a few illustrative examples. Other sizes of unsigned integers, such as byte or wider than 64-bit types (e.g., 128-bit types), are also suitable. Moreover, analogous signed integer types are also suitable.

An add instruction, according to one or more embodiments, may be an add with flags instruction that is operable to cause an execution unit and/or a processor (or other instruction processing apparatus) to generate a sum that is calculated based in part on a plurality of flags. In one or more embodiments, the sum calculated based in part on the plurality of flags may include a sum of three source operands added to an arithmetic combination of the plurality of flags.

Figure 5:
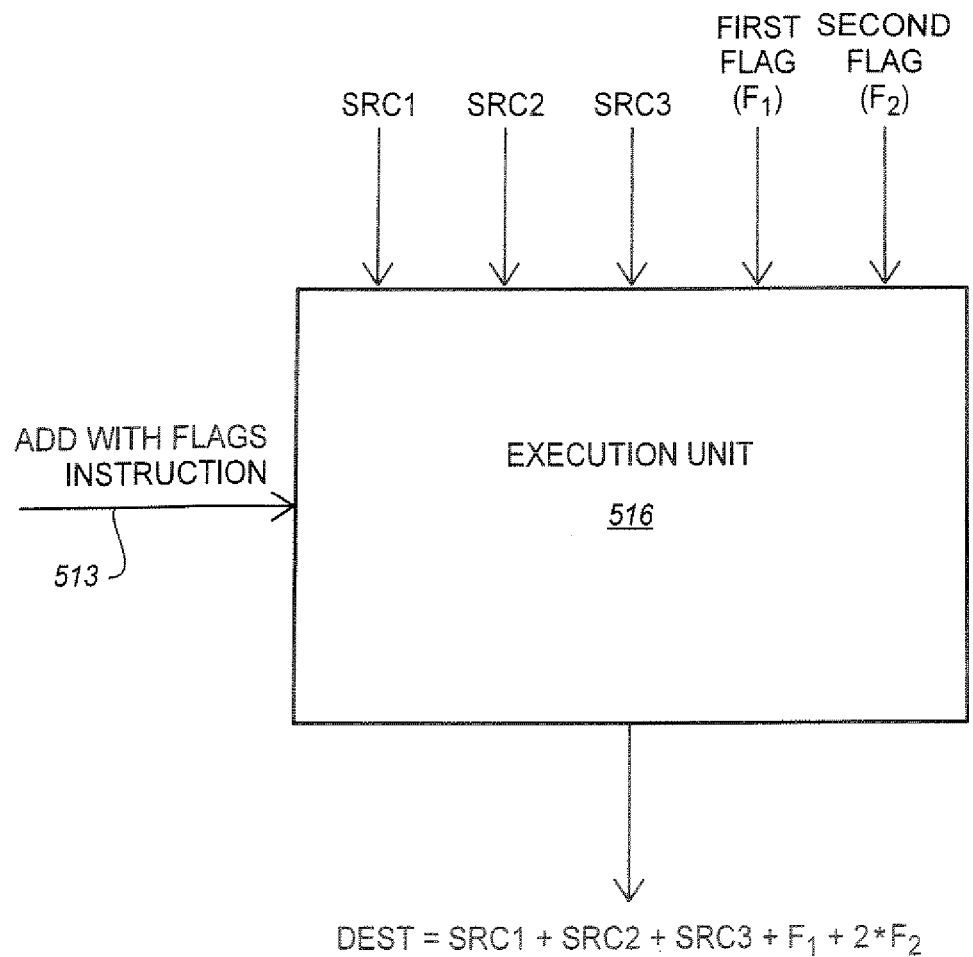
FIG. 5 is a block diagram of an embodiment of an execution unit that is responsive to an embodiment of an add with flags instruction.

FIG. 5 is a block diagram of an embodiment of an execution unit 516 that is responsive to an embodiment of an add with flags instruction 513. The add with flags instruction indicates a first source operand (SRC1), a second source operand (SRC2), a third source operand (SRC3), a first flag (F1) as a source operand, and a second flag (F2) as a source operand. The instruction may indicate the first and second flags as implicit or understood source operands.

In response to the add with flags instruction, the execution unit may receive SRC1, SRC2, SRC3, F1, and F2. In one or more embodiments, the execution unit, as a result of the add with flags instruction, may be operable to store a sum of SRC1, SRC2, and SRC3, which is calculated based in part on the flags F1 and F2, in a destination operand (DEST) indicated by the add with flags instruction. As shown, in one or more embodiments, the sum may be calculated as:

$$DEST=SRC1+SRC2+SCR3+F1+2*F2$$

In this sum, the expression "F1+2*F2" represents an arithmetic combination of the flags F1 and F2. The second flag (F2) has a multiplier of two.

Figure 6:
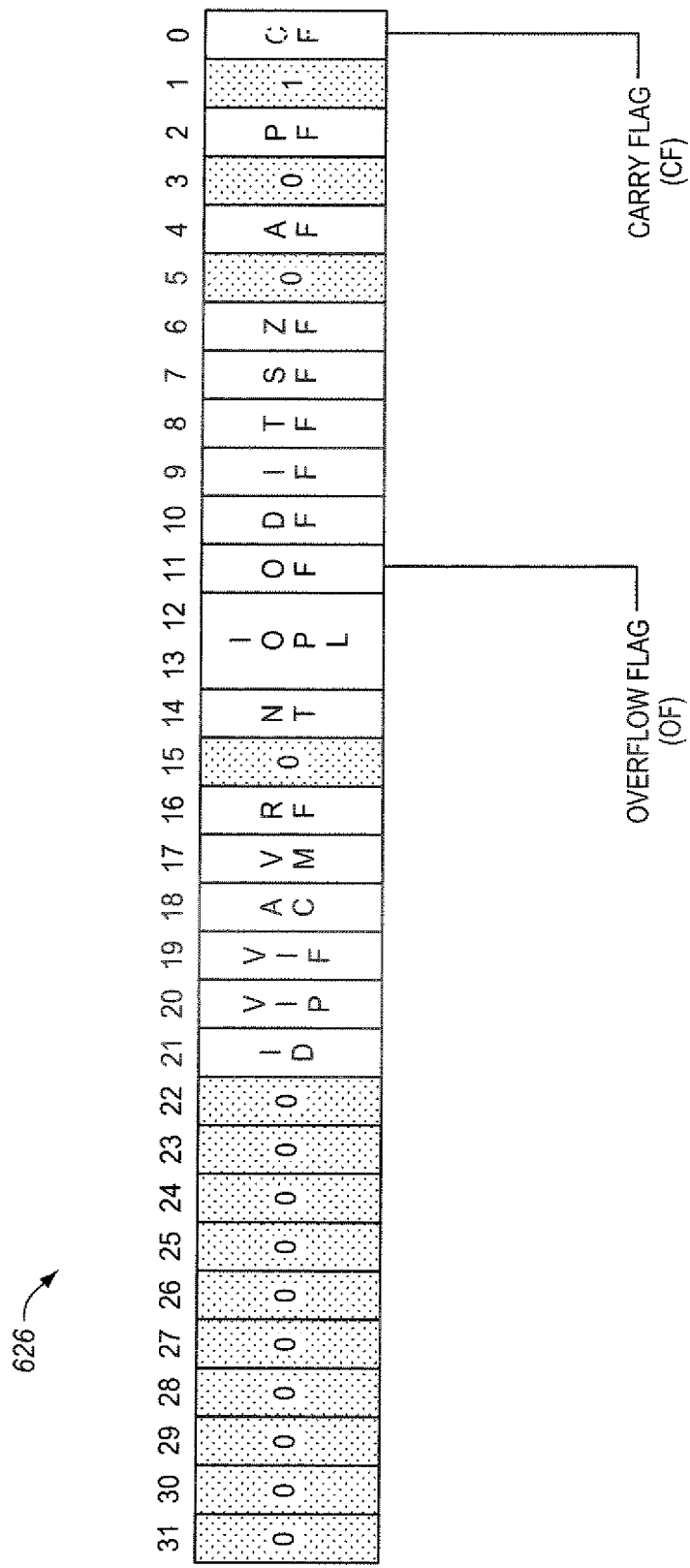
FIG. 6 illustrates an EFLAGS register representing an example embodiment of a flags register having a plurality of flags.

FIG. 6 illustrates an EFLAGS register 626 representing an example embodiment of a flags register having a plurality of flags. The EFLAGS register is a 32-bit register that includes a group of status flags, a control flag, and a group of system flags.

The status flags include a carry flag (CF, bit 0), a parity flag (PF, bit 2), an auxiliary carry flag (AF, bit 4), a zero flag (ZF, bit 6), a sign flag (SF, bit 7), and an overflow flag (OF, bit 11). As previously mentioned, in one or more embodiments, the carry flag (CF, bit 0) and the overflow flag (OF, bit 11) may be used as the first and second flags 222, 224 associated with the add instructions as disclosed herein. The CF and OF are emphasized for this reason, although use of these particular flags is not required.

The system flags include a trap flag (TF, bit 8), an interrupt enable flag (IF, bit 9), an I/O privileged level (IOPL, bits 12-13), a nested task (NT, bit 14), a resume flag (RF, bit 16), a virtual-8086 mode (VM, bit 17), an alignment check (AC, bit 18), a virtual interrupt flag (VIF, bit 19), a virtual interrupt pending (VIP, bit 20), and an ID flag (ID, bit 21). The control flag includes a direction flag (DF, bit 10). Bits 22-31 of EFLAGS are reserved.

The EFLAGS register is the successor to an earlier 16-bit FLAGS register. Additionally, the EFLAGS register, in 64-bit mode processors, has been succeeded and extended to 64-bits by an RFLAGS register. The lower 32-bits of RFLAGS is the same as EFLAGS.

The EFLAGS register is one particular example embodiment of a register having suitable flags for implementing one or more embodiments, although this particular register and these particular flags are certainly not required. Additional description of the EFLAGS/RFLAGS registers, and the carry flag, if desired, is available in Intel® 64 and IA-32 Architectures Software Developer's Manual, Volume 1: Basic Architecture, Order Number: 253665-032US, September 2009.

In one or more embodiments, an add instruction may indicate one or more source operands and/or one or more destination operands in a general-purpose register set. In one or more embodiments, these general-purpose registers may be used to store integers.

FIG. 7 illustrates an example embodiment of a suitable 32-bit general-purpose register set 740. The 32-bit register set includes eight 32-bit or doubleword general-purpose registers. These registers are referred to as EAX, EBX, ECX, EDX, ESI, EDI, EBP, and ESP. These 32-bit registers are also addressable in 16-bit and 8-bit modes. The lower 16 bits of the EAX, EBX, ECX, and EDX registers are referred to as AX, BX, CX, and DX, respectively. By way of example, word unsigned integers having 16-bits may be stored in the registers BX, CX, and DX, respectively. Doubleword unsigned integers having 32-bits may be stored in the registers EAX, EBX, ECX, EDX, ESI, EDI, EBP, ESP, R8D-R15D.

FIG. 8 illustrates an example embodiment of a suitable 64-bit general-purpose register set 850. The 64-bit register set includes sixteen 64-bit or quadword general-purpose registers. These registers are referred to as RAX, RBX, RCX, RDX, RSI, RDI, RBP, RSP, R8, R9, R10, R11, R12, R13, R14, and R15. These registers are operable in 32-bit mode on 32-bit operands, and operable in 64-bit mode on 64-bit operands. The lower 32-bits of the RAX, RBX, RCX, RDX, RSI, RDI, RBP, and RSP registers respectively correspond to the EAX, EBX, ECX, EDX, ESI, EDI, EBP, and ESP registers. The lower 32-bits of the registers R8-R15 are also addressable in 32-bit mode and are referred to by R8D-R15D. By way of example, quadword unsigned integers having 64-bits may be stored in the registers RAX, RBX, RCX, RDX, RSI, RDI, RBP, RSP, or R8-R15.

These general-purpose registers are available in various x86 architecture processors, and are suitable for implementing one or more embodiments, although these particular registers certainly are not required. Additional description of the general purpose registers, if desired, is available in Intel® 64 and IA-32 Architectures Software Developer's Manual, Volume 1: Basic Architecture, Order Number: 253665-032US, September 2009.

An add instruction, according to one particular example embodiment, is an ADD3—Unsigned Integer Addition of Three Operands instruction. The ADD3 instruction may have a standard 3-byte x86 opcode that may optionally have a REX prefix to address more registers and a wider data space.

The ADD3 instruction is a three-operand instruction, with two of the operands being explicit operands, and the other operand being an implicit operand. The instruction operand encoding for the ADD3 instruction is shown in Table 1.

TABLE 1

| ADD3 Operand Encoding | | | |
|---|---|---|---|
| Operand1 | Operand2 | Operand3 | Operand4 |
| ModRM:reg (R,W) | ModRM:r/m (R) | Implied EAX/RAX (R) | N/A |

Operand1 is explicitly specified and may be in the 32-bit general-purpose registers (reg) for the 32-bit mode instruction, or in the 64-bit general-purpose registers for the 64-bit mode instruction. Read (R) and write (W) is allowed for Operand1.

Operand2 is explicitly specified and may be in the 32-bit general-purpose registers (r), or memory (m), for the 32-bit mode instruction, or in the 64-bit general-purpose registers (r), or memory (m), for the 64-bit mode instruction. Read (R) is allowed for Operand2.

Operand3 is implicitly identified as the 32-bit EAX general-purpose register for the 32-bit mode instruction, or as the 64-bit RAX general-purpose register for the 64-bit mode instruction. The Operand3 is used as an implied or implicit source operand. The EAX/RAX registers are also an implicitly identified destination operand for the MULX instruction discussed elsewhere herein. Read (R) is allowed for Operand3. Operand4 is not available for the ADD3 instruction.

FIG. 9 shows a description of an ADD3 instruction representing a particular example embodiment of an add instruction. A 16-bit operand size is presently not encodable for the ADD3 instruction. The ADD3 defines the carry flag (CF) and overflow flag (OF) differently than the ADD instruction in Intel 64 and IA-32 Architectures Software Developer's Manual Volume-2A. The CF, OF, SF, ZF, and PF are set based on the result. The SF flag is set, if the most significant bit (e.g., bit [63] in 64-bit mode, or bit[31] in 32-bit mode) of the result is set. The AF flag is set to zero.

FIG. 10 shows operation in pseudocode of an ADD3 instruction representing a particular example embodiment of an add instruction. SRC refers to a source operand, DEST refers to a destination operand, EAX and RAX refer to implicit general-purpose registers, TEMP refers to a temporary or intermediate result, CF refers to the carry flag, and OF refers to the overflow flag. Note that bits [33:32] in 32-bit mode are stored respectively in OF and CF, and that bits [65:64] in 64-bit mode are stored respectively in OF and CF.

An add with flags instruction, according to another particular example embodiment, is an ADOC3—Unsigned Integer Addition of Three Operands with OF/CF Flags instruction. The ADOC3 instruction may have a standard 3-byte x86 opcode that may optionally have a REX prefix to address more registers and a wider data space.

The ADOC3 instruction is a three-operand instruction, with two of the operands being explicit operands, and the other operand being an implicit operand. The instruction operand encoding for the ADOC3 instruction is shown in Table 2.

TABLE 2

| ADOC3 Operand Encoding | | | |
|---|---|---|---|
| Operand1 | Operand2 | Operand3 | Operand4 |
| ModRM:reg (R,W) | ModRM:r/m (R) | Implied EAX/RAX (R) | N/A |

Operand1 is explicitly specified and may be in the 32-bit general-purpose registers (reg) for the 32-bit mode instruction, or in the 64-bit general-purpose registers for the 64-bit mode instruction. Read (R) and write (W) is allowed for Operand1.

Operand2 is explicitly specified and may be in the 32-bit general-purpose registers (r), or memory (m), for the 32-bit mode instruction, or in the 64-bit general-purpose registers (r), or memory (m), for the 64-bit mode instruction. Read (R) is allowed for Operand2.

Operand3 is implicitly identified as the 32-bit EAX general-purpose register for the 32-bit mode instruction, or as the 64-bit RAX general-purpose register for the 64-bit mode instruction. The Operand3 is used as an implied or implicit source operand. The EAX/RAX registers are also an implicitly identified destination operand for the MULX instruction discussed elsewhere herein. Read (R) is allowed for Operand3. Operand4 is not available for the ADOC3 instruction.

FIG. 11 shows a description of an ADOC3 instruction representing a particular example embodiment of an add with flags instruction. A 16-bit operand size is presently not encodable for the ADOC3 instruction. The input OF and CF values have no restrictions; if these flags are both 1, the results of the instruction are well defined since the largest values generated will not cause any overflows. The ADOC3 defines the carry flag (CF) and overflow flag (OF) differently than the ADD instruction in Intel 64 and IA-32 Architectures Software Developer's Manual Volume-2A. The CF, OF, SF, ZF, and PF are set based on the result. The SF flag is set, if the most significant bit (e.g., bit [63] in 64-bit mode, or bit[31] in 32-bit mode) of the result is set. The AF flag is set to zero.

FIG. 12 shows operation in pseudocode of an ADOC3 instruction representing a particular example embodiment of an add with flags instruction. SRC refers to a source operand, DEST refers to a destination operand, EAX and RAX refer to implicit general-purpose registers, TEMP refers to a temporary or intermediate result, CF refers to the carry flag, and OF refers to the overflow flag. Note that bits [33:32] in 32-bit mode are stored respectively in OF and CF, and that bits [65:64] in 64-bit mode are stored respectively in OF and CF. Note also that the sum is based on the arithmetic combination "(2*OF)+CF."

Alternate embodiments of the ADD3 and ADOC3 instructions are also contemplated. For example, in one or more embodiments, the ADD3 and/or ADOC3 instruction may optionally use a VEX encoding. The VEX encoding may allow the instructions to explicitly specify three operands instead of just two. For example, in one or more alternate embodiments, ADD3 may be represented in VEX encoding as: reg=reg+r/m+vvvv. As another example, in one or more alternate embodiments, ADOC3 may be represented in VEX encoding as: reg=reg+r/m+vvvv+OC. Further description of opcodes, encoding, REX, and VEX prefixes, if desired, is available in Intel® 64 and IA-32 Architectures Software Developer's Manual Volume 2A: Instruction Set Reference, A-M, Order Number: 253666-032US, September 2009.

The add instructions disclosed herein are general-purpose instructions and may be used in a wide variety of different types of algorithms. The add instructions are not limited to use in any known algorithms. Rather, it is expected that the add instructions will be used in a wide variety of different types of algorithms.

It is presently believed that the add instructions disclosed herein will help to greatly advance the speed and/or efficiency of large number multiplication. Large number multiplication is used in various different types of algorithms. For example, large integer multiplication is prevalent in modular exponentiation, cryptography, public key encryption, Transport Layer Security (TLS), Secure Sockets Layer (SSL), Internet Protocol Security (IPsec), Internet Protocol version 6 (IPv6)), as well as various other non-cryptographic algorithms. With regard to cryptography, over the past several years, there has been a significant increase in the use of cryptographic algorithms, for example, due to increasingly more Internet and other network transactions being cryptographically secured. As a result, dedicated cryptographic accelerators, embedded cryptographic processors, servers supporting many connections, and the like, may perform such cryptographic algorithms very frequently. Consequently, the performance of these devices may be significantly affected by the speed and/or efficiency at which they are able to perform large integer multiplication. Although perhaps to a lesser extent, desktop and laptop computers, and other devices, also perform large integer multiplication associated with such cryptographic algorithms. High performance computers also perform large number multiplication associated with large number arithmetic. These and other types of electronic devices may also perform large number multiplication for various other non-cryptographic algorithms or uses. Accordingly, new and different instructions that help to increase the speed and/or efficiency of large number multiplication would be useful.

In large integer multiplication at least one integer that is larger than a size of a register or other storage location used to store the integer may be multiplied. For example, a 512-bit, 256-bit, or 128-bit integer may be stored in 64-bit, 32-bit, or smaller registers. As a result, the 512-bit, 256-bit, or 128-bit integer may not fit in a single 64-bit or 32-bit register. Rather, multiple different 64-bit or 32-bit portions of the 512-bit, 256-bit, or 128-bit integer may be stored different 64-bit or 32-bit registers or other storage locations.

Figure 13:
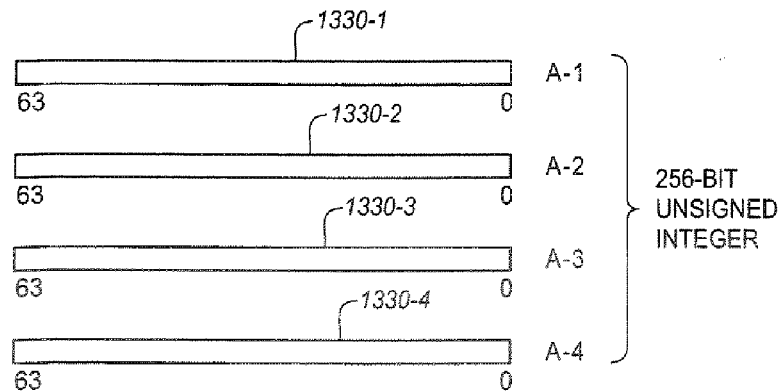
FIG. 13 illustrates an embodiment of a 256-bit unsigned integer stored as four quadword unsigned integers each stored in one of four respective registers.

To further illustrate, FIG. 13 illustrates an embodiment of a 256-bit unsigned integer stored as four quadword unsigned integers A1-A4 each stored in one of four respective registers. In particular, a first quadword unsigned integer (A1) is stored in a first register 1130-1, a second quadword unsigned integer (A2) is stored in a second register 1130-2, a third quadword unsigned integer (A3) is stored in a third register 1130-3, and a fourth quadword unsigned integer (A4) is stored in a fourth register 1130-4. The four quadword unsigned integers (A1-A4) collectively represent the 256-bit unsigned integer. The 256-bit unsigned integer stored in such a way may be referred to as a multi-word vector of unsigned integers.

Performing multiplication on a large integer, which is too large to fit in a single register, may pose certain challenges. For example, more than one multiply instruction may be used. Each multiply instruction may cause multiplication to be performed on only a portion of the large integer to form a partial product. The partial product may represent a fully calculated product of only part of at least one number. Each of these partial products may then be added or otherwise combined to obtain the overall product of the original large integer. Adding the partial products may involve addition with carry propagation.

One suitable multiply instruction is the MUL—Unsigned Multiply instruction. The MUL instruction is described in the Intel® 64 and IA-32 Architectures Software Developer's Manual Volume 2A: Instruction Set Reference, A-M, Order Number: 253666-032US, September 2009, as well as in various older manuals. However, the MUL instruction clears or sets the carry flag (CF) and overflow flag (OF) depending upon the high-order bits of the product. Since the MUL instruction may change the carry flag, the MUL instruction generally should not be placed within a series of add (e.g., ADD/ADC) instructions. Also, the partial product results of the MUL instructions would generally need to be stored, and then the add (e.g., ADD/ADC) instructions subsequently performed on the partial product results. Depending upon the number of registers available, storing all of these partial product results of the MUL instructions before they are added may in some cases tend to consume all of the available registers, resulting in memory fill/spills and/or accesses to system memory.

An alternative to the MUL instruction is the MULX—Unsigned Multiply Without Affecting Flags instruction disclosed in U.S. patent application Ser. No. 12/645,383, filed on Dec. 22, 2009, entitled "MULTIPLICATION INSTRUCTION FOR WHICH EXECUTION COMPLETES WITHOUT WRITING A CARRY FLAG," which is assigned to the assignee of the present patent application. The MULX instruction performs an unsigned multiplication of a first source operand and a second source operand and stores a result in a destination operand without reading or writing arithmetic flags. This possibly enables efficient programming where software can interleave add with carry operations and multiplications. The RDX/EDX register is used as an implicit source. The RAX/EDX register is used as an implicit destination of the low 64/32 bits of result. The high 64/32 bits of the result are written to an explicitly encoded destination register operand.

A relatively simple comparative example of large integer multiplication performed with the known ADD/ADC instructions and the ADD3/ADOC3 particular embodiment instructions disclosed herein help to illustrate the advantages of being able to add three source operands with one add instruction.

Figure 14:
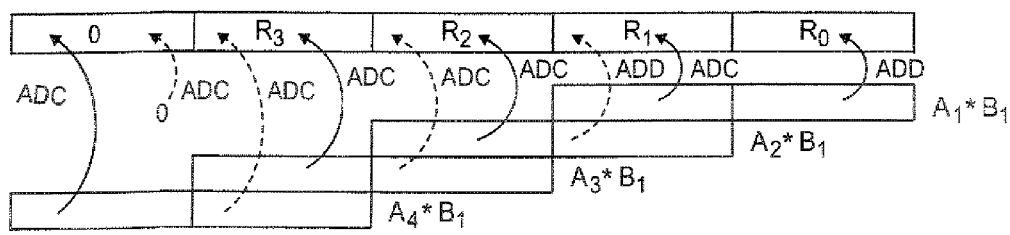
FIG. 14 illustrates multiplication of a 256-bit quadword unsigned integer by a 64-bit unsigned integer, and summation of the associated partial products with ADD/ADC instructions.

FIG. 14 illustrates multiplication of a 256-bit quadword unsigned integer (A1-A4) by a 64-bit unsigned integer (B1), and summation of the associated partial products with ADD/ADC instructions. Recall that an example 256-bit quadword unsigned integer (A1-A4) was shown and described above in conjunction with FIG. 13. For each column except the least/most-significant one, there is a high part of a product, and a low part of a subsequent product, which are to be added to a partial sum. One drawback with the ADD/ADC instructions is that two series of add instructions generally need to be performed. An initial series of add instructions is shown from right to left by the arrows with solid lines, and a subsequent series of add instructions is shown from right to left by the arrows with dashed lines. As shown, nine instructions are used. Many of the additions are adds with carry, which may lead to serialization that may possibly tend to limit the streaming flow of applications. In addition, this may increase the amount of temporary data (e.g., partial sums) that is maintained. In some situations this may tend to exceed the number of registers available leading to memory accesses.

Figure 15:
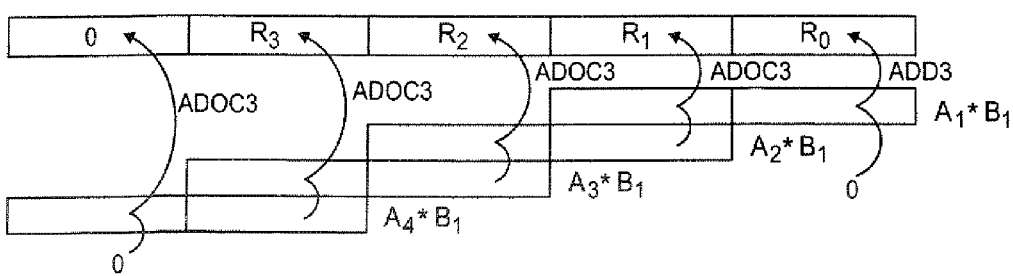
FIG. 15 illustrates multiplication of a 256-bit quadword unsigned integer by a 64-bit unsigned integer, and summation of the associated partial products with ADD3/ADOC3 instructions according to one or more embodiments.

In contrast, FIG. 15 illustrates multiplication of a 256-bit quadword unsigned integer (A1-A4) by a 64-bit unsigned integer (B1), and summation of the associated partial products with ADD3/ADOC3 instructions according to one or more embodiments. Each of these instructions is able to add three integers and there are two flags available to store part of the sum. As a result, it is possible to complete the additions in one pass rather than two. Advantageously, this may help to reduce the serialization of the process. In addition, only five instructions instead of nine are used. Advantageously, this may help to reduce the number of instructions that need to be decoded, buffered, executed, etc. In addition, the number of temporary results that need to be maintained may be reduced, which may help to avoid certain accesses to memory. Each product Ai*B1 may be generated by a MUL or MULX instruction.

Figure 16:
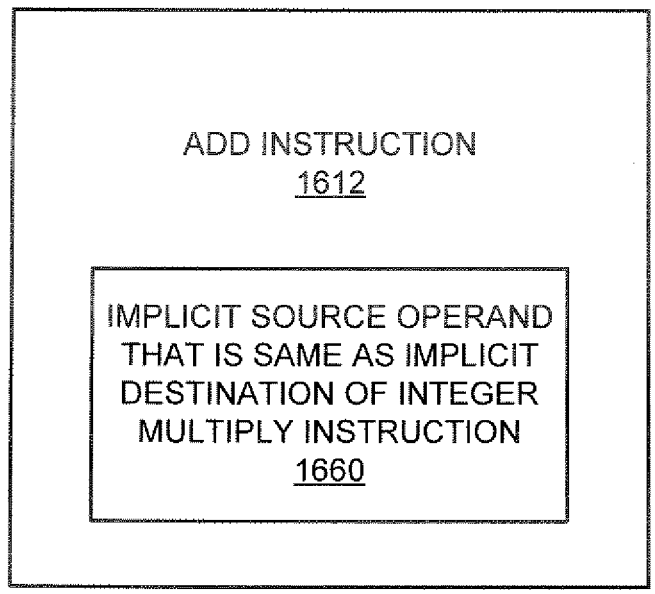
FIG. 16 is a block diagram of an embodiment of an add instruction having an implicit source operand that is the same as an implicit destination operand of an integer multiply instruction.

FIG. 16 is a block diagram of an embodiment of an add instruction. In this embodiment, the add instruction has an implicit source operand (e.g., a storage location) that is the same as an implicit destination operand (e.g., a storage location) of an integer multiply instruction. By way of example, recall from the discussion above that the ADD3 and ADOC3 instructions each had an implicit source operand EAX in 32-bit mode and RAX in 64-bit mode. Also recall from the discussion of the MULX instruction above that the RAX/EDX register is used as an implicit destination of the low 64/32 bits of result of the MULX instruction. Alternatively, another implicit register or other storage location may be used.

In some algorithms this may help to avoid a MOV instruction or other data movement operation. These additional MOV instructions tend to increase the number of instructions that need to be decoded, as well as the number of operations that need to be potentially buffered and executed. Eliminating instructions, such as, for example, move instructions, may help to reduce the number of instructions that need to be decoded/converted, possibly buffered, and executed. Additionally, if a decoded stream buffer (DSB) or the like is to be used, reducing the number of instructions may help to allow a loop of decoded instructions to fit within the DSB, which may further help to increase processing speed by avoiding speed limiting decoding operations. Advantageously, this may help to increase the speed and/or efficiency of large integer multiplication, and certain other algorithms in which the add instruction performs an addition on the product of the multiply instruction.

Other embodiments are not limited to adding only three source operands or using only two flags. In one or more alternate embodiments, four or more source operands may optionally be summed, and three or more flags may optionally be used.

One or more embodiments include an article of manufacture that includes a tangible machine-accessible and/or machine-readable medium having stored thereon an add instruction that if executed by a machine (e.g., an execution unit) causes an add operation to be performed on three operands and/or integers. The tangible medium may include one or more solid materials. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

Suitable machines include, but are not limited to, execution units, general-purpose processors, special-purpose processors (e.g., graphics processors and cryptographic processors), cryptographic accelerators, network communications processors, computer systems, network devices, modems, personal digital assistants (PDAs), cellular phones, and a wide variety of other electronic devices with one or more execution units, to name just a few examples.

Still other embodiments pertain to a computer system, embedded system, or other electronic device having an execution unit and/or performing a method as disclosed herein.

Figure 17:
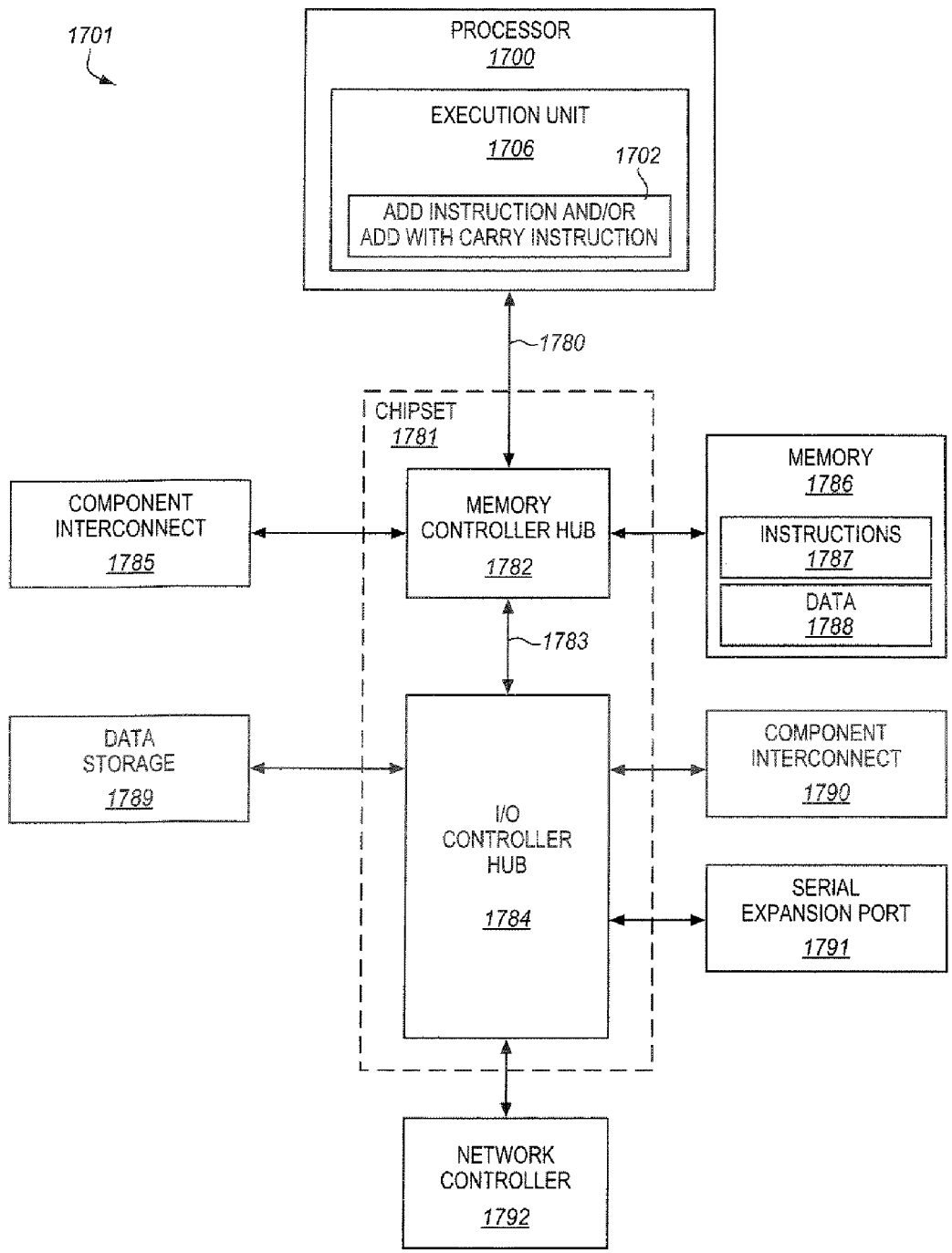
FIG. 17 is a block diagram of a first example embodiment of a suitable computer system.

FIG. 17 is a block diagram of a first example embodiment of a suitable computer system 1701.

The computer system includes a processor 1700. The processor includes at least one execution unit 1706 that is capable of executing at least one add instruction 1702.

The processor is coupled to a chipset 1781 via a bus (e.g., a front side bus) or other interconnect 1780. The interconnect may be used to transmit data signals between the processor and other components in the system via the chipset.

The chipset includes a system logic chip known as a memory controller hub (MCH) 1782. The MCH is coupled to the front side bus or other interconnect 1780.

A memory 1786 is coupled to the MCH. In various embodiments, the memory may include a random access memory (RAM). DRAM is an example of a type of RAM used in some but not all computer systems. As shown, the memory may be used to store instructions 1787, such as one or more add instructions, and data 1788.

A component interconnect 1785 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 1784. The ICH is coupled to the MCH through hub interface bus or other interconnect 1783. In one or more embodiments, the bus or other interconnect 1783 may include a Direct Media Interface (DMI).

A data storage 1789 is coupled to the ICH. In various embodiments, the data storage may include a hard disk drive, a floppy disk drive, a CD-ROM device, a flash memory device, or the like, or a combination thereof.

A second component interconnect 1790 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 1791 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 1782 may be physically integrated on-die with the processor 1700 and the processor may be directly coupled with a memory 1786 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 18:
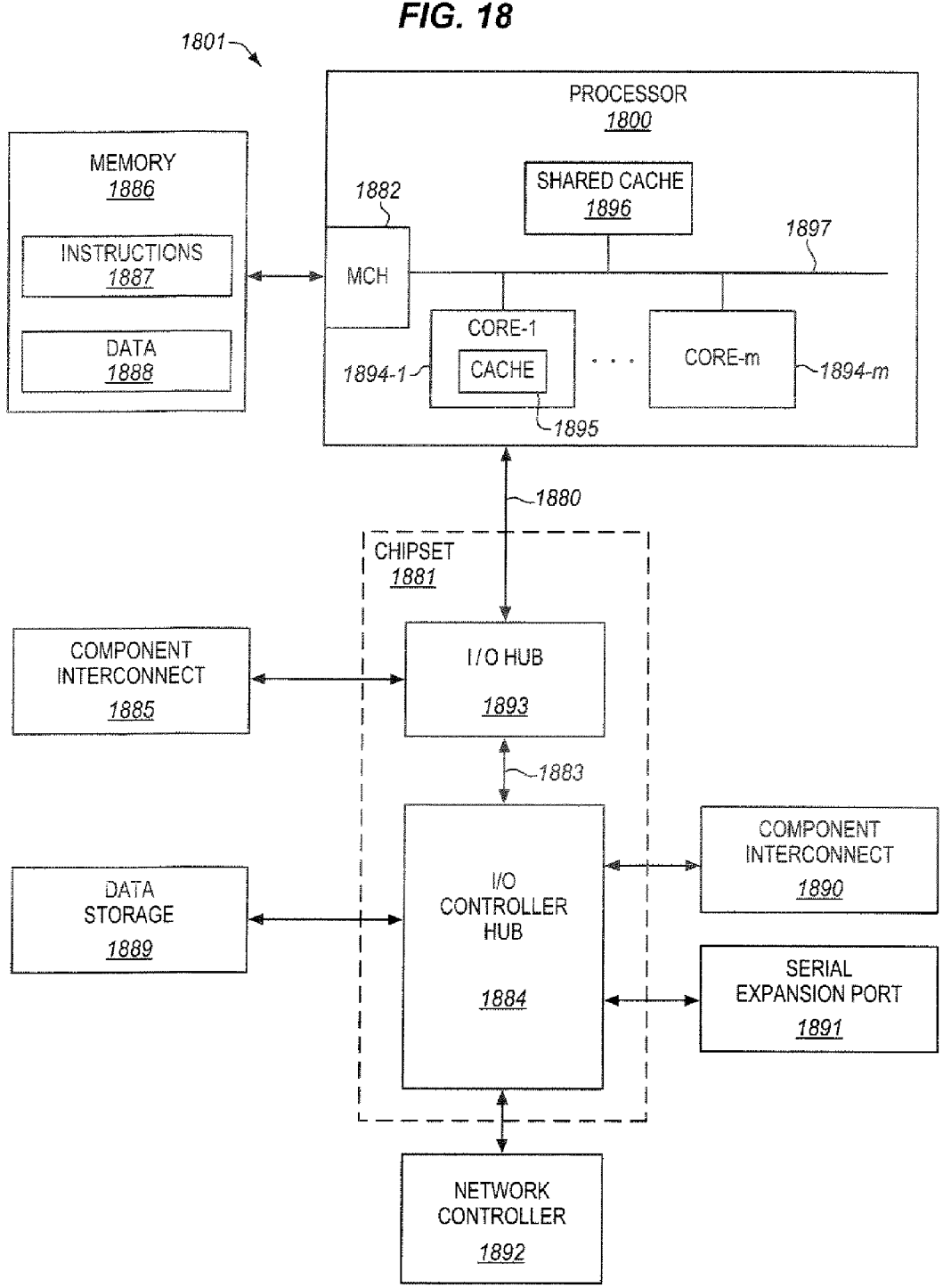
FIG. 18 is a block diagram of a second example embodiment of a suitable computer system.

FIG. 18 is a block diagram of a second example embodiment of a suitable computer system 1801. The second example embodiment has certain similarities to the first example computer system described immediate above. For clarity, the discussion will tend to emphasize the differences without repeating all of the similarities.

Similar to the first example embodiment described above, the computer system includes a processor 1800, and a chipset 1881 having an I/O controller hub (ICH) 1884. Also similarly to the first example embodiment, the computer system includes a first component interconnect 1885 coupled with the chipset, a second component interconnect 1890 coupled with the ICH, a serial expansion port 1891 coupled with the ICH, a network controller 1892 coupled with the ICH, and a data storage 1889 coupled with the ICH.

In this second embodiment, the processor 1800 is a multi-core processor. The multi-core processor includes processor cores 1894-1 through 1894-M, where M may be an integer number equal to or larger than two (e.g. two, four, seven, or more). Each core may include at least one execution unit that is capable of executing at least one embodiment of an instruction as disclosed herein. As shown, the core-1 includes a cache 1895 (e.g., an L1 cache). Each of the other cores may similarly include a dedicated cache. The processor cores may be implemented on a single integrated circuit (IC) chip.

The processor also includes at least one shared cache 1896. The shared cache may store data (e.g., instructions) that are utilized by one or more components of the processor, such as the cores. For example, the shared cache may locally cache data stored in a memory 1886 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 1897. The bus or other interconnect may couple the cores and the shared cache and allow communication.

The processor also includes a memory controller hub (MCH) 1882. As shown in this example embodiment, the MCH is integrated with the processor 1800. For example, the MCH may be on-die with the processor cores. The processor is coupled with the memory 1886 through the MCH. In one or more embodiments, the memory may include DRAM, although this is not required.

The chipset includes an input/output (I/O) hub 1893. The I/O hub is coupled with the processor through a bus (e.g., a QuickPath Interconnect (QPI)) or other interconnect 1880. The first component interconnect 1885 is coupled with the I/O hub 1893.

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to a machine instruction or one or more control signals derived from the machine instruction to store an instruction specified result operand.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
receiving an add instruction, the add instruction indicating a first source operand, a second source operand, and a third source operand; and
storing a sum calculated using the first, second, and third source operands as a result of the add instruction, in which the sum is stored partly in a destination operand indicated by the add instruction and partly in a plurality of flags.

2. The method of claim 1, wherein storing comprises storing a next to most significant bit of the sum in a first flag of the plurality and a most significant bit of the sum in a second flag of the plurality.

3. The method of claim 1, wherein storing the sum partly in the flags comprises storing the sum partly in a carry flag and partly in a second flag.

4. The method of claim 3, wherein the second flag comprises a re-purposed architectural flag.

5. The method of claim 3, wherein the second flag comprises an overflow flag.

6. The method of claim 1, wherein storing the sum comprises storing a sum of the first, second, and third source operands added to a combination of the plurality of flags.

7. The method of claim 6, wherein storing the sum comprises storing a sum of the first, second, and third source operands added to a first flag of the plurality and added to a product that is two times a second flag of the plurality.

8. The method of claim 6, wherein the combination of the plurality of flags includes an overflow flag, and wherein the source operands comprise unsigned integers.

9. The method of claim 1, wherein receiving comprises receiving an add instruction that implicitly indicates a source operand selected from the first, second, and third source operands as a register that is implicitly indicated as a destination operand of an integer multiply instruction of same instruction set architecture.

10. The method of claim 1, wherein the first, second, and third source operands are unsigned integer operands having a size selected from 32-bits and 64-bits.

11. The method of claim 1, performed as part of a multiplication of large integers that are larger than a size of registers used to store them.

12. The method of claim 1, wherein the method is performed by a general-purpose microprocessor having a plurality of cores, and wherein at least one of the cores has circuitry responsive to the instruction.

13. An apparatus comprising:
an execution unit that is operable as a result of an add instruction indicating a first source operand, a second source operand, and a third source operand, to store a sum calculated using the first, second, and third source operands, in which the sum is stored partly in a destination operand indicated by the add instruction and partly in a plurality of flags.

14. The apparatus of claim 13, wherein the execution unit is operable to store a next to most significant bit of the sum in a first flag of the plurality and a most significant bit of the sum in a second flag of the plurality.

15. The apparatus of claim 13, wherein the execution unit is operable to store the sum partly in a carry flag and partly in a second flag.

16. The apparatus of claim 15, wherein the second flag comprises a re-purposed architectural flag.

17. The apparatus of claim 15, wherein the second flag comprises an overflow flag.

18. The apparatus of claim 13, wherein the execution unit is operable to store a sum of the first, second, and third source operands added to a combination of the plurality of flags.

19. The apparatus of claim 18, wherein the execution unit is operable to store a sum of the first, second, and third source operands added to a first flag of the plurality and added to a product that is two times a second flag of the plurality.

20. The apparatus of claim 18, wherein the execution unit is operable to store a sum of the first, second, and third source operands added to a combination of flags that includes an overflow flag, and wherein the source operands comprise unsigned integers.

21. The apparatus of claim 13, wherein the execution unit is responsive to an add instruction that implicitly indicates a source operand selected from the first, second, and third source operands as a register that is implicitly indicated as a destination operand of an integer multiply instruction of a same instruction set architecture.

22. The apparatus of claim 13, wherein the execution unit is responsive to an add instruction that specifies the source operands which have unsigned integers having a size selected from 32-bits and 64-bits.

23. The apparatus of claim 13, wherein the execution unit is included within a core of a multi-core general-purpose microprocessor.

24. The apparatus of claim 13, wherein the execution unit is included within a special-purpose cryptographic device.

25. An apparatus comprising:
an execution unit that is operable as a result of an add instruction indicating a first source operand, a second source operand, and a third source operand each having unsigned integers, to store a sum calculated using the first, second, and third source operands added to a combination of a plurality of flags, in which the sum is stored partly in a destination operand indicated by the add instruction and partly in the plurality of flags.

26. The apparatus of claim 25, wherein the execution unit is operable to store a sum of the first, second, and third source operands added to a first flag of the plurality and added to a product that is two times a second flag of the plurality.

27. A system comprising:
an interconnect;
a processor coupled with the interconnect, the processor operable as a result of an add instruction indicating a first source operand, a second source operand, and a third source operand, to store a sum calculated using the first, second, and third source operands, in which the sum is stored partly in a destination operand indicated by the add instruction and partly in a plurality of flags; and
a dynamic random access memory (DRAM) coupled with the interconnect.

28. The system of claim 27, wherein the processor is operable to store a sum of the first, second, and third source operands added to a combination of the plurality of flags.

29. An article of manufacture comprising:
a non-transitory machine-readable storage medium including solid matter to store an add instruction,
the add instruction to indicate a first source operand, a second source operand, and a third source operand and if executed by a machine to cause the machine to perform operations comprising:
calculating a sum using the first, second, and third source operands; and
storing the sum partly in a destination operand indicated by the add instruction and partly in a plurality of flags.

30. The article of claim 29, wherein the processor is operable to calculate the sum of the first, second, and third source operands added to a combination of the plurality of flags.

* * * * *